Patented Jan. 14, 1936

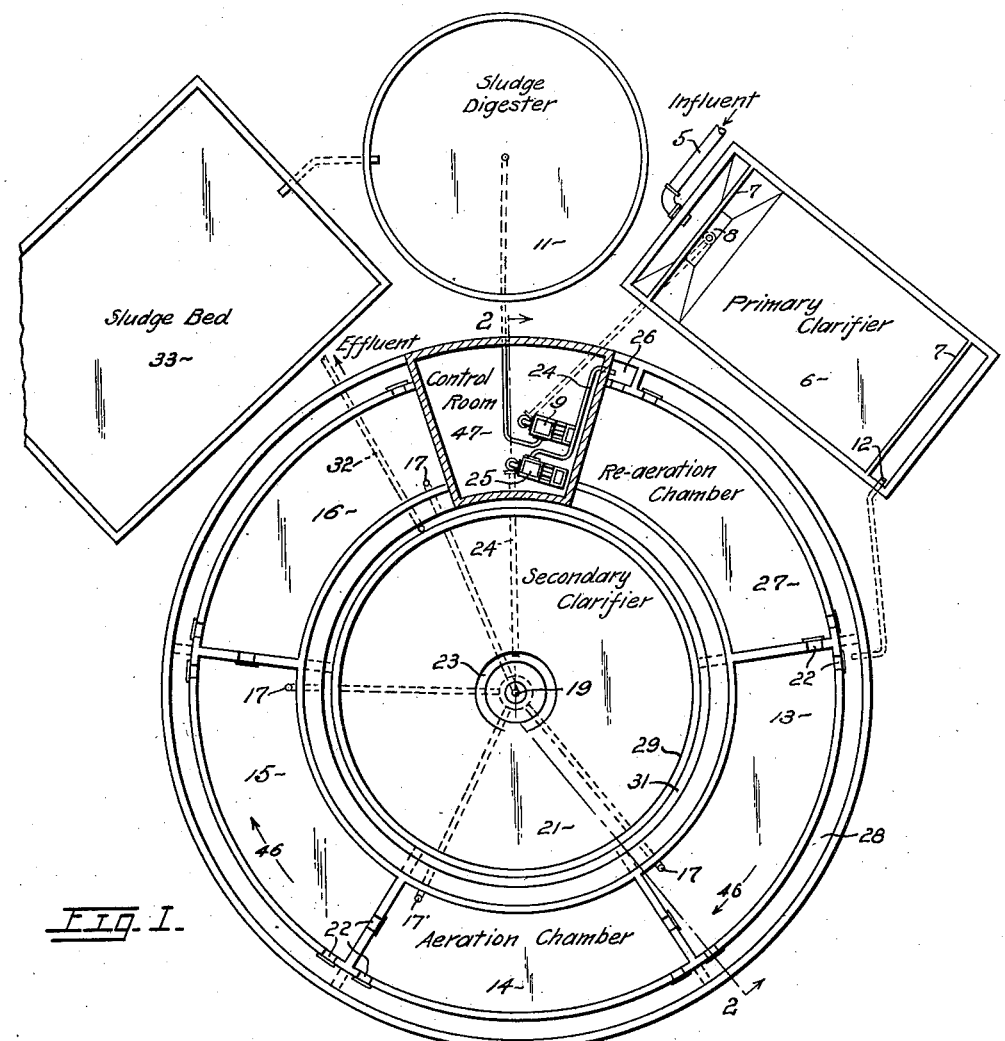
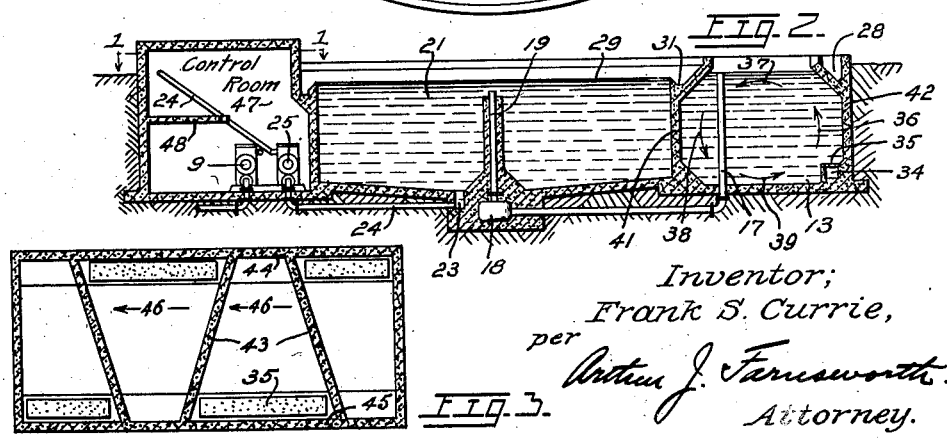

2,027,370

UNITED STATES PATENT OFFICE 2,027,370

APPARATUS FOR TREATING SEWAGE

Frank S. Currie, San Bernardino, Calif.

Application January 24, 1934, Serial No. 708,131

4 Claims. (Cl. 210—8)

My invention relates to improvements in methods and apparatus for the treatment of sewage by the activated sludge process. Among its objects are; first, to secure a more effective, and therefore more efficient, use of air in the operation of sewage disposal works of this kind; second, to achieve reductions in the cost of installation and operation of such works; third, to generally improve the cooperative arrangement of the structural elements required in installation of this nature; and, fourth, to accomplish these objects by means of simple construction.

My objects are attained in the manner illustrated in the accompanying drawing, in which—

Figure 1 is a diagrammatic plan view of a substantially complete activated sludge plant, which embodies my invention;

Figure 2 is a cross-sectional elevation of a portion of the aforesaid construction, taken on the plane 2—2 of Figure 1; and Figure 3 is a sectional plan view of a type of construction that may be substituted for certain parts shown in the other two figures.

Similar reference numerals refer to similar parts throughout the several views.

In the arrangement of plant illustrated in Figs. 1 and 2, untreated sewage enters the plant through inlet pipe 5. It then flows longitudinally through a primary clarifying tank 6, wherein settlement of a very considerable portion of the solid contents takes place. Under-flow weirs 7 assist in this process. The settled solids are collected in a sump 8, and are removed therefrom, more or less continuously, by a pump 9; being discharged by the pump into a sludge digester 11.

The partly clarified sewage from primary clarifier 6 flows (or is pumped) through pipe 12 into a series of aeration chambers, indicated at 13, 14, 15 and 16. These chambers should be arranged in such manner that they may be operated singly or together; the usual arrangement being to pass the sewage through all of them in series.

In Figs. 1 and 2, the aeration chambers are shown in the form of annular sectors, disposed about a common center. Each of them is provided with a vertical outlet pipe 17, leading to a connecting fitting 18, and thence to a vertical pipe 19 serving as an inlet to secondary clarifier 21. A flexible arrangement of inlet devices for the aeration chambers, such as the gates 22, also is provided. This permits of cleaning the chambers separately, and of meeting other possible operating contingencies. Each aeration chamber thus is capable of being operated as an independent unit.

Further settlement and separation of contained solids takes place in secondary clarifier 21, the solids tending to settle in sump 23. A portion of these solids may be more or less continuously pumped therefrom, by means of pipes 24 and pump 25, to a weir box 26 at a relatively high elevation. This weir box overflows into re-aeration chamber 27, wherein re-vivification (activation) of the contained aerobic bacteria takes place. The outflow from the re-aeration chamber may be utilized for seeding the aeration chambers 13—16 in the usual manner, by the use of gates 22. A gutter 28 is provided around the outer perimeter of the structure, at the top, for this purpose.

The portion of the sludge collected at sump 23 that is not required for activation and re-seeding the aeration chambers, is pumped directly to digester 11. The clarified liquid from secondary clarifier 21 overflows circular weir 29, at the outer periphery of the clarifier, into circular gutter 31, and escapes through effluent pipe 32. The products of digester 11 are discharged upon a sludge bed 33, completing the sewage treating process, as it has been generally described above.

In aeration chambers 13—16, air is pumped into the sewage, to provide the aerobic bacteria therein with free oxygen with which to oxidize the organic contents. For this purpose compressed air is delivered through submerged conduits at 34, and porous filtrose plates 35; the latter constituting portions of the upper walls of the conduits. These filtrose plates are well known articles of commerce, and they consist of porous fused quartz. The compressed air from the conduits escapes through them into the sewage, in finely divided bubbles.

In the arrangement shown in Figs. 1 and 2, the compressed air conduits are located at the bottom of the outer walls of the aeration chambers, and air escaping from the filtrose plates is directed straight upwards. In this manner the escaping air is enabled to impart to the sewage mass, a tendency to rotate, in the manner indicated by arrows 36, 37, 38 and 39. This circular motion, when combined with the longitudinal gravitational flow that also is provided for, results in causing the sewage to flow helically through the length of the aeration chambers. This allows sufficient time for the aerobic bacteria in the sewage to function efficiently, to oxidize the organic matter therein, in a manner that is well understood.

The helical flow movement of the sewage is important to secure, because the downward portion of the flow, indicated by arrow 38, tends to carry some of the finely divided air bubbles back down into the sewage mass. Such bubbles, having to make the same circuit of flow over again, obviously will remain in contact with the sewage much longer than they would if they were permitted to break the surface thereof; and the longer the bubbles can be retained in the sewage mass, the greater will be the effect of this treatment.

The natural buoyancy of the air bubbles in the sewage causes them to tend to move upwardly, with the same velocity at all points of the sewage mass. At arrow 36 it would be desirable to retard the circular velocity of the sewage, to keep the bubbles in contact therewith longer. At arrow 38, on the other hand, it would be desirable to speed up the downward velocity of the sewage, to a degree considerably more than necessary to overcome the natural upward velocity of the air bubbles, so that the net effect would be to retain the air bubbles in the sewage mass for at least another round of circulation. At arrow 37, it is desirable to quickly accelerate the cross-flow of the sewage, to shorten the time during which it would be possible for the air bubbles to break the surface. At arrow 39 the velocity of the circular flow of the sewage should be decelerated.

By the use of aeration chambers in the form of annular sectors, as illustrated in Figs. 1 and 2, I am able to fully realize the benefits of the principles just discussed. Obviously the length of the inner chamber walls 41 is much less than the length of the outer walls 42 in proportion to the difference between their respective diameters. Consequently the circular velocity of the sewage mass, by reason of the differences in the available flow areas, will be least at arrow 36 and greatest at arrow 38. By reason of the gradual decrease in available flow area, the velocity at arrow 37 is accelerated. At arrow 39 the velocity will be gradually reduced. The character of circulation in the aeration chambers that I have provided, thus corresponds exactly with that which is theoretically most desirable.

The same results of circulation may be secured in the use of straight aeration chambers, if diagonally arranged cross walls 43 are employed, in the manner shown diagrammatically in plan in Fig. 3. In this case the short walls 44 correspond to the inner circular walls 41 of Figs. 1 and 2; and the long walls 45 correspond to the outer circular walls 42. The filtrose plates 35 are, of course, arranged along side of the long walls of the tanks.

In each of the arrangements shown, the sewage flows helically through the aeration chambers in the general direction indicated by arrows 46; suitable gates, or other flow passages, being provided for passing the sewage from tank to tank.

The circular arrangement of the various treating chambers indicated in Figs. 1 and 2, will be found to be particularly economical, both in construction and operation. This is because of the smaller investment resulting from the more economical use of space; and because of greater convenience in operation. A sectorial control room 47 is readily available by the use of such construction, and the compact arrangement requires less piping, and shorter runs of pipe, than ordinarily are required. In such a control room, the necessary pumps, heaters, chlorinators, and blowers may be most conveniently located. The lighter apparatus, such as the blowers, can be very economically and satisfactorily installed on a mezzanine floor 48 in the control room.

Obviously, such a plant as that described, will require a considerable amount of auxiliary equipment. This has not been illustrated or described herein, since it does not constitute any part of my invention.

I claim:

1. In combination; a clarifying chamber; a plurality of aeration chambers around the periphery of the clarifying chamber; and means for causing fluid contents of the aeration chambers to circulate about horizontal lines intermediate their inner and outer peripheral walls; said aeration chambers being adapted for interconnection, and for discharging ultimately into said clarifying chamber.

2. In combination; a circular clarifying chamber; a plurality of co-axial aeration chambers having the shape of annular sectors in plan, immediately outside the clarifying chamber; and means for causing fluid contents of the aeration chambers to circulate about curved horizontal lines intermediate their curved walls; said aeration chambers being adapted for interconnection, and having selective means for discharging ultimately into said clarifying chamber, in series or singly.

3. In combination; a circular clarifying chamber; a plurality of co-axial chambers having the shape of annular sectors in plan, surrounding the clarifying chamber and making common use of its peripheral wall; means for utilizing certain of the last said chambers for aeration chambers; means for causing fluid contents of the aeration chambers to rotate about curved horizontal lines intermediate their curved walls; and means for selectively interconnecting said aeration chambers, and for discharging their contents ultimately into said clarifying chamber in series or singly.

4. In combination; a circular clarifying chamber; a plurality of co-axial aeration chambers having the shape of annular sectors in plan, immediately outside the clarifying chamber; and means located along the bottoms of the outer circular walls of said aeration chambers, adjacent thereto, for blowing comminuted air upwardly into fluid contents of said aeration chambers; said aeration chambers being adapted for interconnection, and having selective means for discharging ultimately into said clarifying chamber, in series or singly.

FRANK S. CURRIE.